United States Patent [19]
Golahny et al.

[11] 3,771,050
[45] Nov. 6, 1973

[54] REACTANCE MEASUREMENT APPARATUS

[76] Inventors: Yehuda Golahny, 24 Dorr Rd., Newton, Mass. 02158; David A. Gwinn, 66 Page Rd., Bedford, Mass. 01730

[22] Filed: Jan. 3, 1972

[21] Appl. No.: 215,004

[52] U.S. Cl. ............... 324/57 R, 324/59, 324/60 C, 324/61 R
[51] Int. Cl. ............................................. G01r 27/00
[58] Field of Search ................. 324/57 R, 59, 60 C, 324/61 R

[56] References Cited
UNITED STATES PATENTS

| | | | |
|---|---|---|---|
| 3,243,699 | 3/1966 | Kummer | 324/57 R |
| 3,034,044 | 5/1962 | Konigsberg | 324/57 R |
| 3,408,566 | 10/1968 | Norwich | 324/61 R |
| 2,618,686 | 11/1952 | DeLange | 324/57 R |
| 2,143,094 | 1/1939 | Swift | 324/57 R |
| 3,419,799 | 12/1968 | Papadeas | 324/57 R |
| 3,518,536 | 6/1970 | Shih-Ying Lee et al. | 324/57 R |

*Primary Examiner*—Stanley T. Krawczewicz
*Attorney*—John E. Toupal

[57] ABSTRACT

Disclosed is an apparatus for measuring the energy storage characteristics of passive electrical components such as capacitors and inductors. In a capacitative embodiment an a.c. signal alternately charges and discharges a capacitor under test and a second a.c. signal similarly charges and discharges a standard reference capacitor. An indicator that displays current flow is alternately connected to the capacitors by a switch that is synchronized to the a.c. signals. The relative amplitudes of the a.c. signals are adjusted so that each capacitor absorbs an equal charge and the indicator is responsive to this condition and displays a null indication. A capacitance change in either capacitor causes a departure from the null condition. A preferred embodiment is disclosed in which the capacitor under test is a variable capacitance transducer. Inductance measurements are made with a similar inductance circuit.

19 Claims, 6 Drawing Figures

REACTANCE MEASUREMENT APPARATUS

BACKGROUND OF THE INVENTION

This invention relates to electrical measurement devices, and more particularly to devices for measuring the energy storage characteristics of passive electrical components such as capacitors and inductors.

Many applications involving precision electronic equipment require that the values of capacitors and inductors be accurately known. Measurement of these component values is made more difficult if other factors are considered in the test. For example, test requirements can entail subjection of the component under test to the frequency at which it will ultimately function, and sometimes to a wide range of expected operational frequencies. In addition, such tests at operating frequencies may include various environmental effects. That is, environmental conditions such as temperature, pressure or humidity may be varied during the test requiring that the component be located remotely from the testing apparatus. A closely related problem involves sensor apparatus to detect either absolute values or changes in temperature, pressure, humidity etc. that utilizes variable inductance or variable capacitance transducers as sensing elements. To provide high sensitivity the detection circuitry must be capable of measuring small changes in capacitance or inductance in the presence of large shunting values thereof. Compounding this problem, such sensor elements are often located remotely from the detection circuitry and connected thereto by long cables. The steady state capacitance and inductance measured by the detection circuit is substantially affected by such cables.

Inasmuch as the measurement difficulties described above are all variants of the same problem, that of accurately and rapidly measuring component values, similar circuitry is usually employed for all of the applications considered. That circuitry usually comprises a balanced bridge. However, bridges have not proven completely satisfactory for several reasons. For example, bridges are nonlinear, and both reactance and resistance must be adjusted to achieve a balance. Not only is a dual adjustment requirement time consuming, but it severely limits accuracy for two reasons. First, while resistances may be easily adjusted and then accurately measured, such is not the case with reactances. Assume, for example, that the method of varying the reactance is to adjust a reference capacitance. Indications of capacitance of variable capacitors are derived from a measurement of shaft angle. Slipage in the coupling of the shaft and the indicators will cause an inaccurate indication of angle and dirt between the plates of a capacitor or bent plates will cause a change in capacitance at any given shaft angle. Secondly, resistance is made a part of a bridge circuit, and therefore extraneous resistance (for example, the long connecting cable mentioned above) becomes an element of the circuit, rendering the analysis thereof more difficult.

The object of this invention therefore, is to provide measurement apparatus that will measure small values of, or small changes in capacitance or inductance over a wide frequency and value range, and that is substantially independent of circuit resistance. In addition, it is another object to provide such a device that is both inexpensive and reliable.

SUMMARY OF THE INVENTION

This invention is characterized by apparatus for measuring the energy storage properties of passive electrical components such as capacitors and inductors. Terminals within the apparatus receive a component to be tested and the apparatus includes a standard electrical component of the same type as is to be tested. For example, if the terminals are to receive a capacitor, the comparison circuit would include a standard capacitor. A power source supplies a primary a.c. sensing signal to the terminals, and a secondary a.c. sensing signal to the standard component. (In some of the embodiments disclosed herein the sensing signals are a.c. signals with a d.c. component impressed thereon yielding a varying unidirectional signal. As will be apparent below, it is the a.c. component that provides the necessary energization and deenergization of the components.) The sensing signals are square wave voltages of different amplitudes. Thus the component to be tested and the standard component, both capacitors, are repeatedly charged and discharged by the power source. An output circuit includes an ammeter that is alternately connected in series with the capacitor to be tested and the standard capacitor by a switch that is synchronized with the power source by a synchronization circuit. Operation of the apparatus includes repeatedly charging and discharging both the capacitor under test and the reference capacitor by the associated a.c. sensing signal, and synchronization of the switching so that the meter senses charging current to one capacitor and discharge current from the other. Disregarding capacitor leakage resistance, a null condition is observed on the meter when the charges repeatedly absorbed by each of the capacitors are equal. When such a condition occurs, if the secondary sensing signal is a fraction, $f_1$ of the amplitude of the primary signal, then $f=C_x/C_r$ as will be explained more fully below, Leakage in either capacitor produces a steady state error since it causes the meter to register that the capacitor under test is absorbing more energy than it actually does, or that the reference capacitor is discharging less energy than was stored, but, once a null is achieved, small capacitance changes are indicated without respect to leakage. Circuit resistance is important only in that the switch must remain stationary until the apparatus has reached a substantially steady state condition. That is, the switch must not move until both capacitors are fully charged or completely discharged. Consequently, so long as circuit resistances are kept low enough that time constants are substantially less than the period of the a.c. sensing signals, circuit resistance is inconsequential. Therefore, an advantage of this system is that components may be tested at their working frequencies, or over a range of frequencies, subject only to an upper frequency limit determined by the time constants as mentioned above, and a lower frequency limit below which the ammeter movement responds to each current pulse rather than registering an average current. Within this range, results are independent of the a.c. signal frequency. Furthermore, the system is inexpensive to make and extremely simple to operate. In addition, the meter may be calibrated directly in farads if the fraction $f$ remains constant and a single standard capacitance is to be used.

Another feature of this apparatus is a utilization of a single square wave generator in the power source that supplies the primary a.c. sensing signal and an attenuator that samples the primary a.c. signal and supplies the secondary a.c. signal. The attenuator in a preferred embodiment disclosed herein consists of a variable resistance voltage divider. An advantage of this circuit is that the constant phase relationship between the primary and secondary sensing signals that is required for accurate readings is assured since there is only one voltage generator. Also, an indication of the relative resistances of the two halves of the divider yields the ratio of secondary sensing signal to primary sensing signal $f$, and therefore the ratio of capacitances is independent of the amplitude of the voltage source. Readout only requires resistance measurements that can be easily made, and inasmuch as the two sensing signals are related proportionally, minor fluctuations in the amplitude of the square wave generator do not affect accuracy of the results. Thus, an improvement is provided over conventional capacitance measurement devices, such as bridges, which as described above require undesirable adjustment of both capacitance and resistance in order to achieve a balance.

Another embodiment disclosed herein includes a variable capacitance transducer as the capacitor to be tested. It is to be understood that the variable capacitance transducer can be responsive to any of several conditions such as temperature, pressure or humidity. In the example disclosed herein the transducer is responsive to temperature. An integrator that averages current flow therethrough, yielding an output of a voltage proportional to that average replaces the ammeter and controls a heater that is therefore responsive to the temperature sensed by the transducer. An advantage of this system is that it is inexpensive to build, and yields fast and accurate response. Furthermore, sensing systems including these transducers are often coupled to a remote sensor by a long cable that significantly increases the input capacitance to the measurement apparatus so that small changes in the transducer capacitance are difficult to measure. With the present invention, however, adjustment of a reference potentiometer voltage to compensate for the capacitance of the transducer cable enables the operator to easily achieve a null condition, and renders the device sensitive to small capacitance changes in the transducer.

Another embodiment disclosed herein measures inductance, or small changes thereof in the presence of a large average inductance. The circuit used therefor is similar to the capacitance measurement circuit. The advantages mentioned above with respect to the capacitance measurement embodiment are also applicable to the inductance measurement embodiment. For example, the apparatus itself is easy to operate and is inexpensive to assemble, and the meter may be calibrated in terms of henries. Also, measurement over a wide frequency range is possible and the circuit is linear, yielding results in the form of a proportion as will be described more fully below. A variable inductance sensor may be used if desired.

DESCRIPTION OF THE DRAWINGS

These and other features and objects of the present invention will become more apparent upon a perusal of the following description taken in conjunction with the accompanying drawings wherein.

DESCRIPTION OF THE PREFERRED EMBODIMENTS

Figure 1:
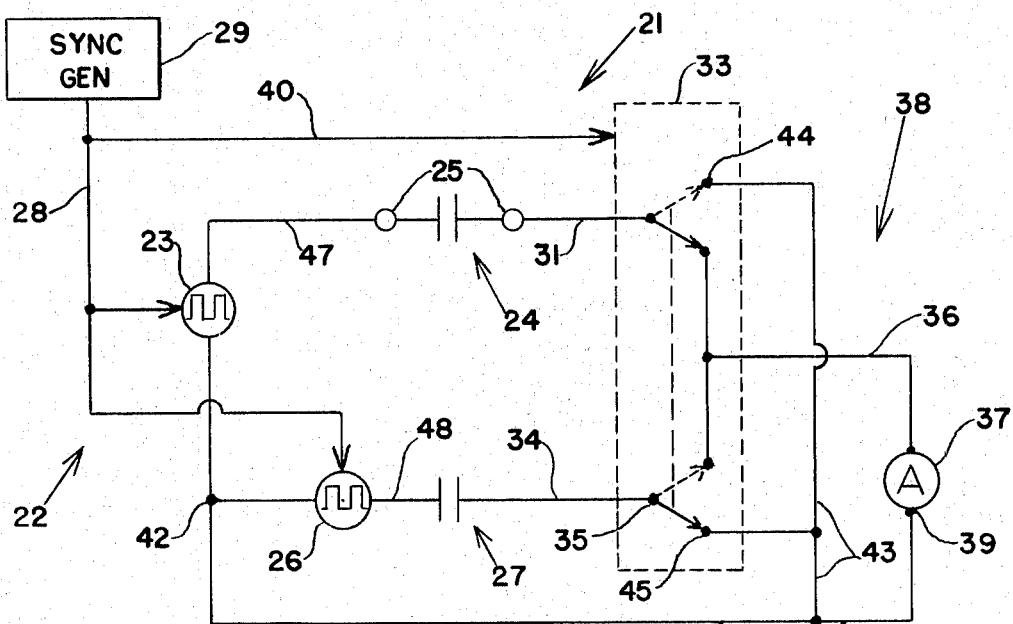
FIG. 1 is a schematic diagram of a system for measuring energy storage properties of capacitors.

Referring first to FIG. 1 there is shown an apparatus 21 for measuring the energy storage properties of capacitors. A power source 22 includes a first source 23 that supplies a primary a.c. sensing signal to a capacitor under test 24 that is retained by conductive terminals 25, and a comparison source 26 that supplies a secondary a.c. sensing signal to a standard reference capacitor 27 in a comparison circuit. Both sources 23 and 26 are connected by a line 28 to a sync generator 29 that insures that the primary and secondary a.c. sensing signals are in phase. A line 31 couples the capacitor 24 under test to a common terminal 32 within a metal oxide semiconductor solid state switch 33 and another line 34 leads from the standard reference capactior 27 to another common contact 35 within the switch. When in the position shown in FIG. 1, the switch 33 connects the line 31 to a line 36, and therefore to an ammeter 37 that, with the switch 33, comprises an output circuit 38. A common terminal 39 of the ammeter is connected by a line 41 to a common junction 42 of the voltage sources 23 and 26. When the switch 33 is in the position shown by the dotted lines in FIG. 1, the line 31 is connected by an auxiliary contact 44 and a line 43 directly to the line 41, and therefore bypasses the meter 37. Also, when the switch 33 is in the position shown by the dotted lines in FIG. 1, the line 34 is connected to the line 36 and therefore to the ammeter 37. When the switch is in the position shown in FIG. 1 the line 34 is connected directly to the line 41 by an auxiliary contact 45 and the line 43. Thus, at all times the lines 31 and 34 are connected to the common line 41 either directly through the line 43, or through the meter 37, and as will be explained more fully below, small resistance differences between the two paths do not affect the circuit 21. Consequently, the difference in resistance between the line 43 and the meter 37 can be disregarded, and the lines 31 and 34 considered constantly connected to the line 41 from the point of view of current flow. A line 46 connected the sync generator 29 to the switch 33, thereby insuring the switching is synchronized to the a.c. voltages produced by the sources 23 and 26.

Figure 2:
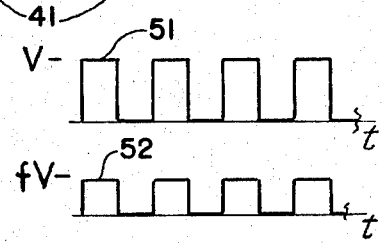
FIG. 2 shows various waveforms present at selected points with the circuit shown in FIG. 1.

Referring next to FIG. 2 there is shown some waveforms present at various points in the circuit 21 of FIG. 1. Shown first is a square waveform 51 that alternates between the level of zero and V volts with one complete cycle in the time of T. The waveform 51 represents the output of the first source 23 available on a line 47. Also shown is a waveform 52 that is a square wave of the same frequency oscillating between zero volts and a maximum of $fV$ volts (where $f$ is an adjustable value), and that is the output of the comparison source 26 and is carried to the reference capacitor 27 by a line 48. It will be appreciated that the waveforms 51 and 52 represent a.c. square waves with d.c. components impressed thereon. It is only the a.c. components that causes the charging and discharging needed for measurement. For an analysis of a system in which the d.c. component is eliminated before the signal is applied to the capacitor under test 24 and the reference capacitor 27, refer to the circuit depicted in FIG. 5. The capacitor under test 24 will repeatedly charge to a maximum of Q coulombs as shown by waveform 53. Since the line 31 is considered electrically connected to the line 41, the capacitor 24 is connected directly across the source 23. Small resistance within the circuit 21 will provide the characteristically exponential waveform 53 shown, but as will be explained more fully below, for purposes of analysis the effects of resistance can be disregarded as long as a steady state is reached before any voltage translation is made. If the value of the capacitor under test 24 is $C_x$ then the maximum change Q is determined by $$Q = VC_x \tag{1}$$

Similarly, the standard reference capacitor 27 is connected across the source 26 and is alternately charged to a maximum value and discharged as shown by waveform 54. As will be explained below, it is desired to have the reference capacitor 27 charged to a maximum of Q also. This will occur if the capacitance of the standard reference capacitor 27 equals $C_r$ and $$Q = fVC_r \tag{2}$$

The switch 33 changes state at each voltage transition in the waveforms 51 and 52. Assuming for example that the switch 33 is positioned as shown by the solid lines in FIG. 1 and the waveform 51 is at the maximum value of V, the line 34 is connected directly to the line 41 by the line 43 and the line 31 is connected to the line 41 by an ammeter 37. Therefore, the charging current going to the capacitor 24 under test flows through the meter 37. Assuming that the cycles of the waveform 51 are reasonably symmetrical (minor deviations therefrom are not important as long as a steady state of charge in the capacitor 24 is reached before switching) the average current I flowing through the meter during the charging of the capacitor 24 for that one half cycle $$I = \frac{2}{T} \int_0^{\frac{T}{2}} \frac{dQ}{dT} dt \tag{3}$$

or $$I = 2/T \, Q \tag{4}$$

This current creates a deflection in the ammeter in a positive, or test direction. Upon the negative going transition of the waveforms 51 and 52, the switch 33 switches to the position shown by the dotted lines in FIG. 1, so that the capacitor under test discharges directly through the line 43. Simultaneously, the standard reference capacitor 27 discharges through the meter 37. Noting that equations (3) and (4) above are independent of voltage, and assuming that both capacitors 24 and 27 retained equal charge Q as described above, we see that the average current I flowing through the meter 37 during discharge of capacitor 27 is $I=2/T \, Q$. Inasmuch as the current is now negative, the meter 37 registers a deflection in the direction opposite the test direction, or the negative direction. Therefore, if the capacitors 24 and 27 are absorbing equal charges, and the frequency, $1/T$, is sufficiently high that the meter cannot respond thereto, a null reading will be observed. Any variations of this equal charge condition will cause the meter to move from the null position. If the circuit reaches a steady state before the switch 33 is actuated, circuit resistances are not important since the current I depends only on charge Q.

During use, the null condition is achieved by adjusting the amplitude of the comparator source 26. Once the null position is achieved we find $$VC_x = Q = fVC_r \tag{5}$$

and therefore $$f = (C_x/C_r) \tag{6}$$

so that $C_x$ is found independently of time and voltage V. If the circuit 21 is to be used to measure small changes in capacitance, the null condition can be set up, and any small capacitance change will cause a slight deflection therefrom. However, the circuit 21 can also be used to measure absolute values of capacitance and the equations given above allow measurement of capacitance in terms of $f$, $V$ and $C_r$. Also, if a single reference capacitor 27, a fixed voltage V and a fixed fraction $f$ are used, the meter 37 can be calibrated directly in terms of farads.

Figure 3:
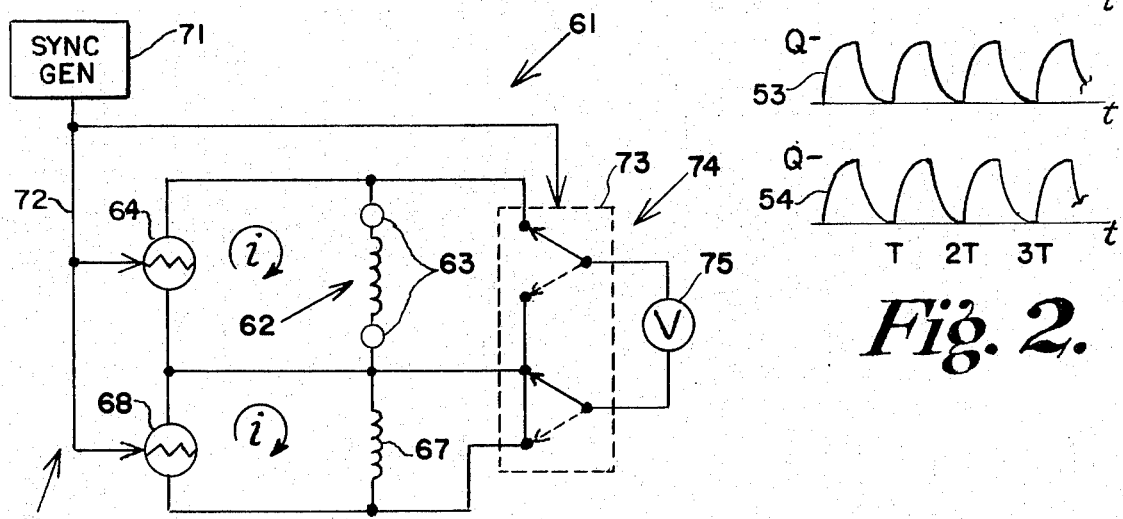
FIG. 3 is a schematic diagram of another system for measuring energy storage properties of inductors.
Figure 4:
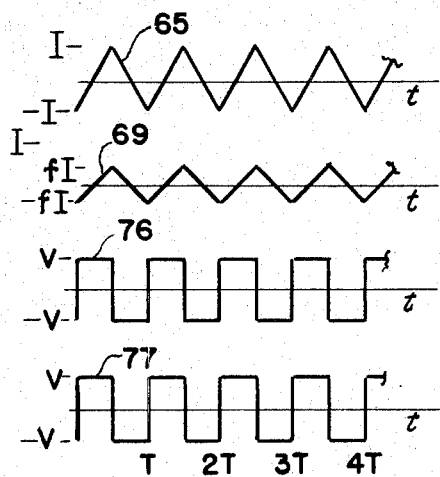
FIG. 4 shows waveforms present at selected points in the circuit shown in FIG. 3.

Referring now to FIGS. 3 and 4, there is shown a circuit 61 to measure the energy storage characteristics of an inductor under test 62 that is retained by two conductive terminals 63. Connected across the inductor 62 under test is a first current source 64 that produces the positive and negative ramp sensing signals shown as waveform 65 in FIG. 4. A comparator circuit 66 includes a standard reference inductor 67 with a comparator current source 68 connected therewith. A secondary sensing signal, shown by the waveform 69, similar to the waveform 65, and in phase with it, but of a variable fraction, $f$, of its amplitude is produced by the source 68. The positive direction for both sources 64 and 68 is shown by the arrows in FIG. 3. Together the sources 64 and 68 comprise a combined power source 70. A sync generator 71 is connected by a line 72 to both sources 64 and 68, insuring a constant phase relationship therebetween and is also connected to a metal oxide semi-conductor double pole, double throw switch 73 that is part of an output circuit 74 that includes a detector voltmeter 75. The switch 73 alternately connects the voltmeter 75 across the inductor under test 62 and the standard reference inductor 67. The synchronization of the sources 64 and 68 and the switch 73 is such that the meter is connected in parallel with the inductor under test for one half a cycle of T seconds, and in parallel with the standard reference inductor 67 for the remaining half cycle. It will be appreciated that the operation of circuit 61 is similar to that of the circuit 21 and therefore as extensive an analysis of circuit 61 will not be given.

If the inductance of the inductor 62 under test equals $L_x$, then the voltage $V$ thereacross equals $V=L_x(dI/dt)$ and since $(dI/dt)$ is a constant of alternating polarity, the voltage $V$ across the inductor under test 63 will equal a constant voltage of alternating polarity as shown by a waveform 76. If the inductance of the standard reference inductor 67 equals $L_r$ and $f$ is adjusted so that the voltage across the standard reference inductor equals $V$ we find $$V=L_r f(dI/dt) \qquad (8)$$

Therefore, since $f(dI/dt)$ is a constant of alternating polarity, the voltage across the standard reference inductor 67 is a constant voltage of alternating polarity as shown by waveform 77 in FIG. 4.

During operation, the switch 73 is in the position shown in FIG. 3 during the positive going portions of the waveform 65, and therefore measures the positive voltage $V$ across the inductor under test 62. As the waveforms 65 and 69 switch to the negative going ramps, the switch 73 changes so that the meter 75 is connected in parallel with the standard reference inductor 67 and measures the value $-V$ thereacross. Therefore, if the waveforms 65 and 69 are symmetrical (the sync generator 71 is adjusted so that this is so), the voltmeter 75 shows a null condition. When this null condition is achieved, $$L_x(dI/dt)=V=L_r f(dI/dt) \qquad (9) \text{ or}$$

$$f=(L_x/L_r) \qquad (10)$$

so that the value of the inductor under test 63 is found without reference to the voltage $V$. As with the circuit 21, the circuit 61 can measure absolute values, or small changes in values and the meter scale can be calibrated in terms of henries if desired.

Figure 5:
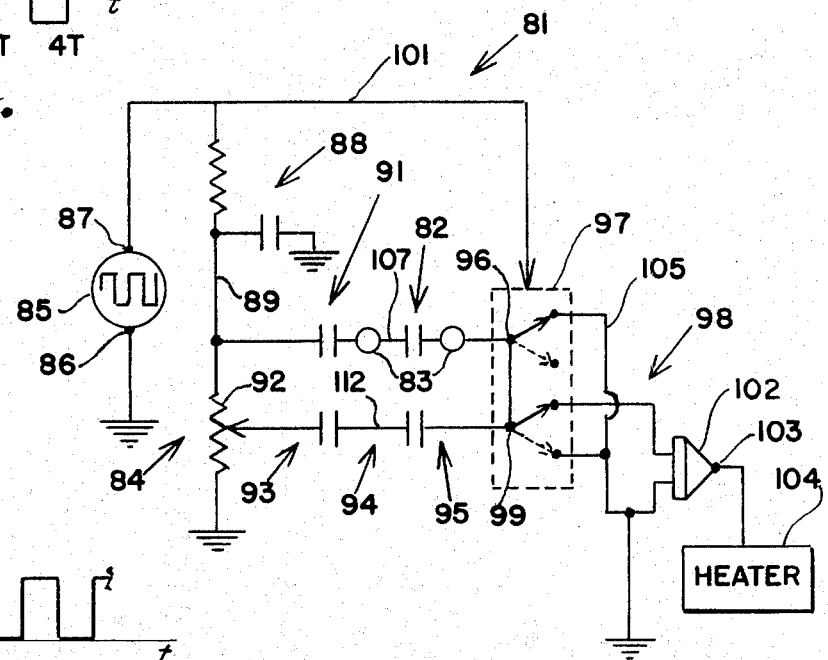
FIG. 5 is a schematic diagram of a control system for measuring the energy storage property of capacitors in which the capacitor under test is a variable capacitance transducer.

Referring next to FIG. 5 there is shown a control circuit 81 for measuring the capacitance of a test or sensing capacitor 82, that is a variable capacitance transducer and is connected to the circuit 81 by conductive terminals 83. The capacitance of the transducer 82 is dependent upon ambient temperature. A power source 84 includes a square wave voltage generator 85 with one terminal 86 thereof grounded, and another terminal 87 connected to a wave shaping circuit 88 and supplying a primary a.c. sensing signal on a line 89. A large bias capacitor 91 couples the primary a.c. sensing signal to the transducer 82. A variable resistive voltage divider 92 samples the primary a.c. sensing signal and provides a secondary a.c. sensing signal in phase therewith but at a fraction, $f$, of the amplitude thereof to another bias capacitor 93. The fraction $f$ is dependent upon the setting of the resistance 92. A comparison circuit 94 includes the bias capacitor 93 and a standard reference capacitor 95 connected thereto. The transducer 82 is connected through the terminal 83 to a common contact 96 in a switch 97 that is part of an output circuit 98, and the standard reference capacitor 95 is connected to another common contact 99 of the switch. Preferably, the switch 97 is a metal oxide semiconductor switch. A synchronizing line 101 connects the terminal 87 of the voltage source 85 to the switch 97, thereby providing a synchronizing signal.

Connected to the output of the switch 97 is a detector, including an integrator 102 that measures current flowing therethrough. The output circuit 98 is similar to the output circuit 38 shown in FIG. 1, and it will be noted that at all times the common terminals 96 and 99 are grounded, either directly by an auxiliary switching circuit and a line 105 or through the integrator 102. As with the circuit 21, small differences in resistance between the two grounding paths are of no importance. Connected to an output 103 of the integrator is a heater 104 that remains in stable operation when no signal is received thereby, but increases or decreases in heat output in response to a positive or negative signal received.

Figure 6:
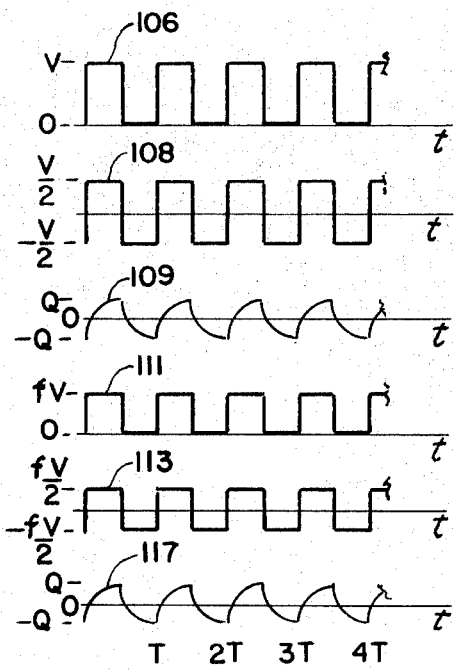
FIG. 6 shows various waveforms present at selected points within the circuit shown in FIG. 5.

Referring to FIG. 6 there is shown a waveform 106 of a square wave alternating between $O$ and $V$ volts. This is the output of the voltage source 85 available at the terminal 87. Substantially this same waveform 106 is also available at the line 89 after passing through wave shaping circuit 88. The wave shaping circuit 88 slightly inhibits the voltage transition to insure that the switch 97 has sufficient time to change state before the transition reaches the line 89, but the delay is so slight that it is not evident from the waveform diagrams. The bias capacitor 91 is large in comparison to the period $T$ of the waveform 106, and does not substantially charge or discharge during a cycle thereof but, charges to a constant value of $V/2$ so that voltage available at a point 107 between the bias capacitor 91 and the transducer 82 is a square waveform 108 alternately between $V/2$ and $-V/2$. Consequently, the charge in the transducer 82 alternately varies from plus $Q$ to minus $Q$ as shown by a waveform 109. As was the case with the circuit 21, the circuit resistance creates the characteristic exponentially shaped waveform 109, but is unimportant if a substantially steady state is reached before a voltage transition occurs. The resistive divider 92 samples the primary a.c. signal on the line 89 and provides an output to the second bias capacitor 93 at a fraction, $f$, thereof. This is shown by a waveform 111. The second bias capacitor 93 is also large with respect to the period of the sensing signals and therefore charges to a constant value of $fV/2$. Consequently, the signal at a point 112 in the circuit between the bias capacitor 93 and the standard reference capacitor 95 is as a waveform 113, that is, a square wave alternating between $(fV/2)$ and $-fV/2$. The total resistance in the voltage divider 92 must be low enough that the time constant of the resistance and the reference capacitor is $<<T$. Similarly to the analysis of the circuit 21 shown in FIG. 1, assume that the standard reference capacitor 95 alternately charges to $Q$ and $-Q$ as shown by a waveform 117. Therefore, if the value of the standard reference capacitor 95 equals $C_r$ the maximum charge attained is $$|Q|=C_r(fV/2) \qquad (11)$$

It will be noted that since the output circuit 98 is similar to the output circuit 38 shown in FIG. 1, with the exception that the integrator 102 is substituted for the meter 37, the integrator will average the charging of one capacitor and the discharge of the other capacitor. The total charge transition is twice the maximum charge so that $$C_x V = 2|Q| = C_r f V \qquad (12)$$

or $$f = (C_x/C_r) \qquad (13)$$

Therefore, the circuit 81 functions just as did the circuit 21.

During operation of the control circuit 81, the transducer 82 will stabilize at a desired ambient temperature determined by adjustment of the resistive divider 92 such that the null condition is sensed by the integrator 102 when the transducer is at the selected temperature. In response to the null condition the integrator 102 produces no output so the heater 104 continues to operate in a stable state. Should the ambient temperature surrounding the transducer 82 fall, the integrator 102 produces an output that causes the heater 104 to increase heat output, and should the ambient temperature rise above the desired value, the integrator causes the heater 104 to reduce its output.

Obviously, many modifications and variations of the present invention are possible in light of the above teachings. For example, the control circuit 81 could be utilized to control other conditions such as pressure, humidity, etc. Also, the disclosed inductance measuring circuit can be similarly used with a variable inductance transducer to sense and control various conditions. It is to be understood, therefore, that the invention can be practiced otherwise than as specifically described.

What is claimed is:

1. Apparatus for measuring energy storage characteristics of passive electrical components comprising:
   conductive terminal means for receiving an electrical component under test;
   comparison means comprising a standard electrical component of the same type as the electrical component under test;
   power source means for producing a primary a.c. sensing signal for repeatedly supplying energy to the electrical component under test and a secondary a.c. sensing signal for repeatedly supplying energy to said standard electrical component; and
   output means including detector means for quantitatively comparing the energy flowing to said electrical components and including switching means synchronized with said power source means to alternately connect said detector to the electrical component under test and said standard electrical component.

2. Apparatus according to claim 1 wherein said detector means comprises an electrical meter.

3. Apparatus according to claim 2 wherein said power source means comprises an a.c. voltage source means, said standard electrical component is a capacitor, said electrical meter is an ammeter and said switching means alternately connects said ammeter in series with the component under test and with said capacitor.

4. Apparatus according to claim 3 wherein said switching means comprises synchronizing means to connect said ammeter to the component under test so as to cause a deflection of said ammeter in a test direction and alternately to said capacitor so as to cause a deflection of said ammeter in a direction opposite the test direction.

5. Apparatus according to claim 4 wherein said switching means further comprises an auxiliary switching means in series with the component under test to couple the primary a.c. sensing signal thereto when said meter is connected to said capacitor, and in series with said capacitor to couple the secondary a.c. sensing signal thereto when said meter is connected to the component under test.

6. Apparatus according to claim 5 wherein said ammeter is calibrated in farads.

7. Apparatus according to claim 5 wherein said a.c. voltage source means comprises a square wave generator for producing the primary a.c. sensing signal and an attenuator means for sampling the primary a.c. sensing signal and supplying the secondary a.c. sensing signal.

8. Apparatus according to claim 7 wherein said attenuator means comprises a resistive voltage divider.

9. Apparatus according to claim 8 wherein said resistive voltage divider comprises variable resistance means.

10. Apparatus according to claim 5 comprising a bias capacitor in series with a component under test, and a second bias capacitor in series with said capacitor.

11. Apparatus according to claim 1 wherein said electrical component under test comprises a transducer responsive to a given condition, and said output means comprises control means for controlling said given condition.

12. Apparatus according to claim 11 wherein the component under test is a variable capacitance transducer.

13. Apparatus according to claim 12 wherein said detector means comprises an integrator means that measures the amount of electrical power flowing therethrough, said integrator means being operatively coupled to said control means.

14. Apparatus according to claim 13 wherein said power source means comprises an a.c. voltage source means, said standard electrical component is a capacitor and said switching means alternately connects said integrator means in series with said transducer and with said capacitor.

15. Apparatus according to claim 2 wherein said power source means comprises an a.c. current source means, said standard electrical component is an inductor, said electrical meter is a voltmeter and said switching means alternately connects said voltmeter in parallel with the component under test and with said inductor.

16. Apparatus according to claim 15 wherein said switching means comprises synchronizing means to connect said voltmeter to the component under test for one half cycle of the primary a.c. sensing signal so as to cause a deflection of said voltmeter in a test direction in response thereto and alternately to said inductor for one half cycle of the secondary a.c. sensing signal so as to cause a deflection of said voltmeter in a direction opposite that of the test direction in response thereto.

17. Apparatus according to claim 16 wherein said voltmeter is calibrated in henries.

18. Apparatus according to claim 16 wherein said a.c. current source means comprises a variable a.c. current source.

19. Apparatus for measuring energy storage characteristics of a passive electrical component and comprising:

comparison means comprising a standard electrical component of the same type as the electrical component under test;

power source means for repeatedly supplying energy to and removing energy from the component under test and said standard component;

output means including detector means for quantitatively comparing the energy received by the component under test and said standard component and including switching means for alternately connecting said detector to the component under test and said standard component; and synchronizing means responsive to said power source means for synchronizing said switching means with the energy supplying and removing cycles of said power source means.

* * * * *